United States Patent
Rasky et al.

[11] Patent Number: 5,744,252
[45] Date of Patent: Apr. 28, 1998

[54] FLEXIBLE CERAMIC-METAL INSULATION COMPOSITE AND METHOD OF MAKING

[75] Inventors: Daniel J. Rasky, Palo Alto; Paul M. Sawko, San Jose; Paul Kolodziej, Redwood City; Demetrius A. Kourtides, Gilroy, all of Calif.

[73] Assignee: The United States of America as represented by the Administrator of the National Aeronautics and Space Administration, Washington, D.C.

[21] Appl. No.: 75,367

[22] Filed: Jun. 11, 1993

Related U.S. Application Data

[60] Continuation-in-part of Ser. No. 700,368, May 6, 1991, abandoned, which is a division of Ser. No. 410,576, Sep. 21, 1989, Pat. No. 5,038,693.

[51] Int. Cl.$^6$ ................................... B32B 18/00
[52] U.S. Cl. .................. 428/594; 428/621; 428/627; 428/632; 228/122.1
[58] Field of Search ......................... 428/621, 594, 428/633, 627, 666, 660, 672, 673, 674, 652, 662, 608, 920; 228/122.1

[56] References Cited

U.S. PATENT DOCUMENTS

| | | | |
|---|---|---|---|
| 4,624,404 | 11/1986 | Ohmae et al. | 228/198 |
| 4,661,416 | 4/1987 | Mizuhara | 428/606 |
| 4,667,871 | 5/1987 | Mizihara | 228/122 |
| 4,713,275 | 12/1987 | Riccitiello | 428/76 |
| 4,735,866 | 4/1988 | Moorhead | 428/627 |
| 4,922,969 | 5/1990 | Campman et al. | 139/408 |
| 5,000,986 | 3/1991 | Li | 427/229 |
| 5,028,495 | 7/1991 | Hirano et al. | 426/622 |
| 5,038,693 | 8/1991 | Kourtides et al. | 112/440 |
| 5,082,161 | 1/1992 | Utida et al. | 228/122 |
| 5,098,795 | 3/1992 | Webb et al. | 428/594 |
| 5,296,288 | 3/1994 | Kourtides et al. | 428/626 |

*Primary Examiner*—David A. Simmons
*Assistant Examiner*—Linda L. Gray
*Attorney, Agent, or Firm*—Kenneth L. Warsh; Guy Miller

[57] ABSTRACT

A method for joining a woven flexible ceramic fabric and a thin metal sheet creating an integral metal surfaced flexible thermal protection article, which method comprises:

placing multiple dots of high temperature metallic or ceramic brazing material between the flexible ceramic fabric and the thin metal sheet in a random or organized pattern, with the proviso that the brazing material covers about 10% or less of the surface of one flat side of the metal sheet;

heating the flexible ceramic fabric, brazing material and thin metal sheet for a predetermined period of time to integrally connect the same; and cooling the formed flexible article to ambient temperature. Preferably the flexible ceramic is selected from fibers comprising atoms of silicon, carbon, nitrogen, boron, oxygen or combinations thereof. The flexible thermal protection article produced is also part of the present invention. The thin metal sheet is comprised of titanium, aluminum, chromium, niobium or alloys or combinations thereof. The brazing material is selected from copper/silver or copper/gold or is a ceramic brazing or adhesive material.

19 Claims, 2 Drawing Sheets

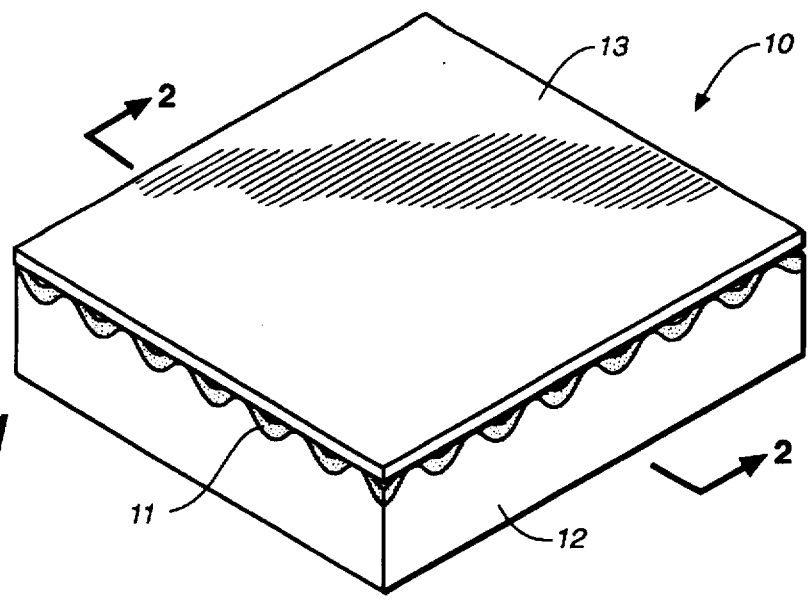
FIG._1
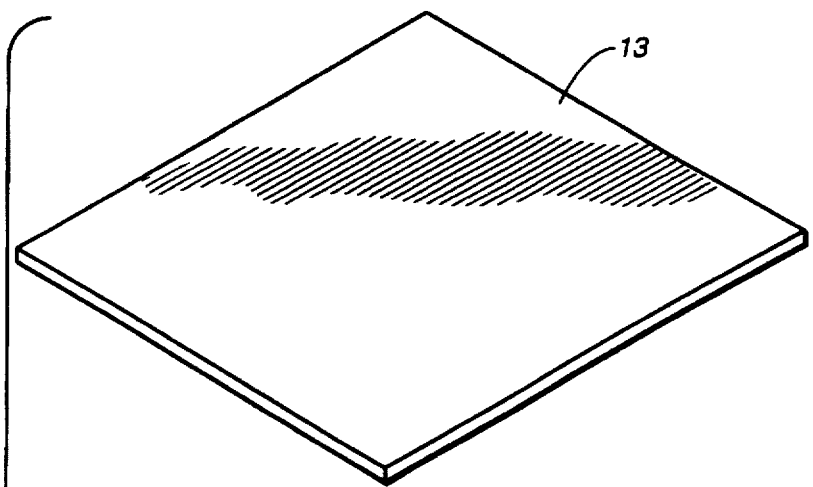
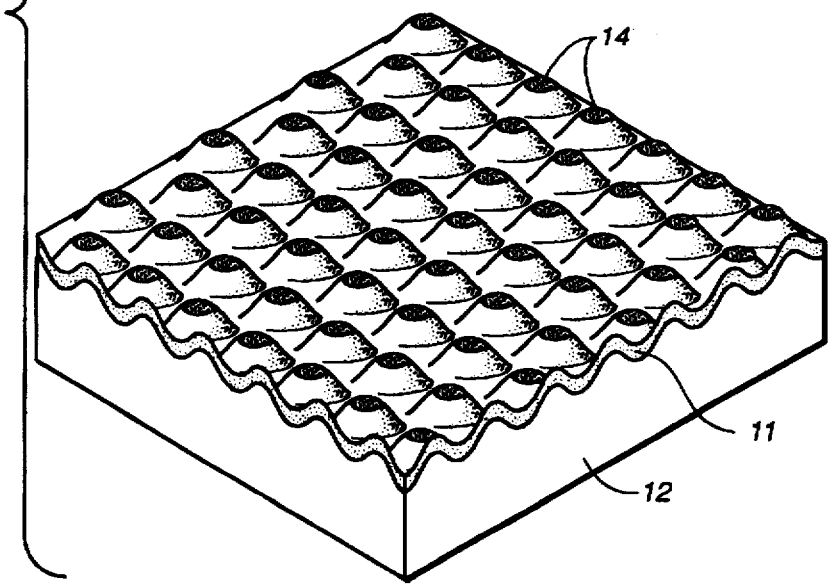
FIG._1A

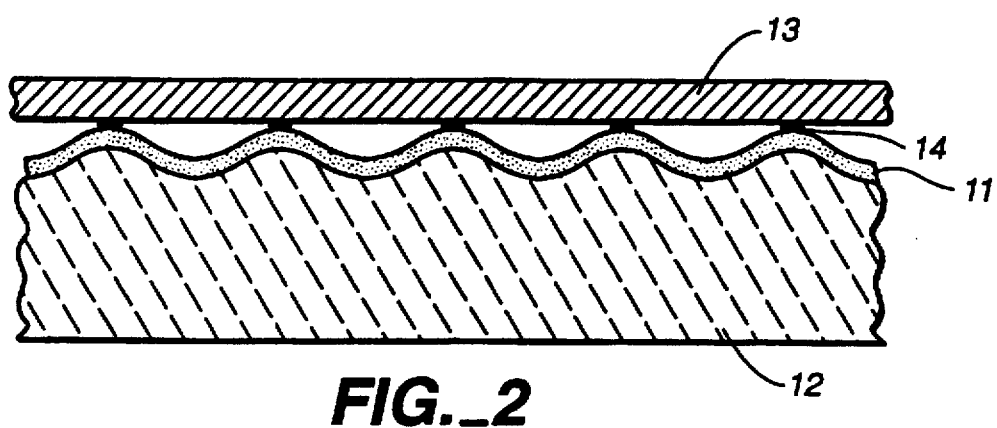
FIG._2

FLEXIBLE CERAMIC-METAL INSULATION COMPOSITE AND METHOD OF MAKING

RELATED APPLICATIONS

This application is a continuation-in-part application of U.S. Ser. No. 700,368, filed May 6, 1991, now abandoned, which is a divisional application of U.S. Ser. No. 410,576, filed Sep. 21, 1989, now U.S. Pat. 5,038,693.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to a flexible ceramic-metal insulation composite article which is tough, durable, and waterproof. The article is produced by thermochemically attaching a metallic face sheet to the top face fabric surface of a fibrous ceramic blanket for use as a thermal protection system. The metal and ceramic fabric are joined by contacting with a metal or ceramic brazing material, followed by heating.

2. Description of Related Art

Previous methods of protecting flexible ceramic blankets from the environment including rain, moisture, and/or humidity resort to the application of an organosilane chemical treatment by:

1. chemical vapor deposition (CVD);
2. painting; or
3. injecting into the blanket itself to provide a hydrophobic barrier to the water environment. However, exposure to a heat source above 850° F. causes organosilane polymers to decompose and to be removed from the blanket. This causes the ceramic insulation blanket to become hydrophilic again to water. Ceramic or organic coatings are not successful because of their inherent porosity, excessive weight, and tendency to crack under thermal or mechanical stress.

The durability of flexible ceramic blankets functioning as thermal protection systems is poor when exposed to dropped tools, sharp objects, or bumping. Also, the flexible fabric surfaces of blankets are damaged when flying through rain, hail or sleet.

Some art of interest includes the following:

A. J. Moorhead in U.S. Pat. No. 4,735,866 discloses a method of joining rigid ceramics and metals to one another at a temperature of 800° C. by using brazing filler metals. The brazing filler metals comprise copper, silver, titanium, and tin. This method produces strong joints that can withstand high temperatures and oxidizing environments. The brazing filler metals strongly adhere and wet the ceramics and can withstand high temperatures.

C. H. Li in U.S. Pat. No. 5,000,986 discloses a method for joining rigid ceramics and metals to one another by forming metallized coatings on ceramics and high-temperatures. The method comprises the steps of: (1) preparing a metallized composition of mixed ingredients of differing sizes; (2) proportioning the differing sizes to have nonsegregating qualities when applied onto the ceramics; (3) coating the metallizing composition onto the ceramics; and (4) heating to form the metallized layer. The method provides flawlessly coated reinforcements for the manufacture of tough, strong, thermochemically stable, and thermomechanically shock-resistant composites. The metallizing composition may include a W/Mo-based type which includes a metallic shock-absorbing layer. The metallic layer is made of an annealed metal which may include copper.

T. Ohmae et al. in U.S. Pat. No. 4,624,404 disclose a method for bonding rigid ceramics with metals comprising the steps of: (1) depositing on the ceramic material an inert material comprising a mixture of at least one metal such as nickel or copper and at least one member selected from the group containing metal oxides, nitrides, and carbides;

(2) subjecting the deposited inert a material to thermal reaction treatment to bond between the inert material and the ceramic material; and (3) bonding a metal member to the surface of the insert material by brazing with a brazing material.

K. Hirano et al. in U.S. Pat. No. 5,028,495 disclose a composite foil brazing material for joining rigid ceramics to each other or to metal, which comprises a core of Ti and outer layers of Ni or and Ni alloy containing a specific amount of Cu. The ceramic material may include $Al_2O_3$ and $ZrO_2$, and the metal may include Ti, Mo, W, Cu, or a composite material with good wettability and a coefficient of thermal expansion close to that of the oxide ceramics.

H. Mizuhara in U.S. Pat. No. 4,667,871 discloses an alloy for brazing rigid ceramic to a ceramic or to a metal, which metal comprises tin, silver, copper, titanium, vanadium, zirconium nickel, or chromium. The brazing alloy is ductile and has a low solidus temperature to provide a low stress joint between two materials having different thermal expansion coefficients.

S. Utida et al. in U.S. Pat. No. 5,082,161 disclose a material for joining rigid ceramics and metal plates comprising a nickel plate and titanium-copper type braze which is disposed adjacent to the ceramics. These materials are heated for a desired period of time under a vacuum condition.

D. A. Kourtides, et al. in U.S. Pat. No. 5,038,693 disclose a thermal protection system of a composite flexible multilayer insulation system. The flexible multilayer insulation comprises alternating layers of an internal metal foil and outer scrim ceramic cloth vacuum metallized polymeric film quilted together using a ceramic thread. The flexible blanket insulation obtained is often called a composite flexible blanket insulation (CFBI).

S. R. Riccitiello et al. in U.S. Pat. No. 4,713,275 disclose a rigid ceramic reusable externally applied thermal protection system. The system functions by using a composite device created by combining an upper shell, thermal insulation and a lower tile component.

A. R. Campman et al. in U.S. Pat. No. 4,922,969 disclose a flexible multilayer woven fabric having varying material composition through its thickness.

None of this art individually or collectively in any fashion teaches or suggests the present invention.

All of the articles, patents, patent applications, standards, references and the like cited in this application are expressly incorporated by reference in their entirety.

What is needed in the art is a flexible thermal protection system having improved production techniques and reduced maintenance. Further, the thermal protection system should have improved exterior surface characteristics. The present invention of a flexible integral metal sheet covered flexible ceramic fabric attached to each other by a brazing process using a metal brazing or a ceramic brazing material provides a solution to the above listed problems.

SUMMARY OF THE INVENTION

The present invention relates to a method for joining a woven flexible ceramic fabric and a thin metal sheet creating an integral metal surfaced flexible thermal protection composite article, which method comprises;

placing a high temperature metallic or a ceramic brazing material at multiple contact points located in an organized or random pattern between the flexible ceramic fabric and the thin metal sheet;

heating the flexible ceramic fabric, brazing material and thin metal sheet for a predetermined period of time to integrally connect the same at the multiple contact points; and cooling the formed composite metal-ceramic article to ambient temperature.

Preferably the total area covered by the multiple contact points is a total of about 10% or less of the total surface of one flat surface of the metallic sheet.

In another embodiment, the present invention relates to an integral metal surfaced flexible ceramic composite thermal protection article produced by the described method.

In another embodiment the present invention relates to an integral metal sheet surfaced flexible thermal protection article comprising:

a thin metallic sheet as a surface component;

a flexible ceramic in fabric form as a subcomponent; and a multiplicity of high temperature metallic or ceramic material contact points which connect contacting regions of the thin metal sheet and flexible ceramic fabric.

Optionally the ceramic fabric is precoated with a thin layer of metal or alloy, such as nickel.

BRIEF DESCRIPTION OF DRAWINGS

FIG. 1 is an isometric representation of the integral flexible thermal protection system.

FIG. 1A is an exaggerated exploded view of FIG. 1. The protrusions are shown in exaggerative height.

FIG. 2 is a schematic cross sectional representation of the integral flexible thermal protection system along section 2—2.

DETAILED DESCRIPTION OF THE INVENTION AND PREFERRED EMBODIMENTS

Definitions

As used herein:

"ASTROQUARTZ®" refers to a registered trademark of the JPS Textile Group, Inc. of Greenville, S.C. It describes a quartz or silica fiber or fabric, and is available in a number of sizes and grades, e.g. Astroquartz II.

"Ceramic brazing material" refers to ceramic precursors and/or adhesives selected from a silica, an alumina or a zirconia based adhesive, such as Cotronics Adhesive No. 944 and 940 ($SiO_2$) as examples. These ceramic materials are available from Cotronics Corporation, Brooklyn, N.Y.

"INCONEL®" refers registered trademark of the Inco Corporation. It describes an aluminoborosilicate (ABS) fiber or fabric.

"Flexible" refers to ceramic fibers which have not been bonded to each other by a sintering or fusing process and therefore remain capable of being deformed without severe breakage or damage to the fiber bundles. Thus, these fiber bundles are able to be woven into various weave patterns to form a flexible fabric surface. The deformation is as much as about 10% in any direction from the original position.

"Metallic brazing material" refers to alloys of copper/silver, copper/gold and the like with titanium or vanadium as wetting agents or combinations thereof. These metallic materials when heated melt and wet the adjacent contacted surfaces and form strong metal bonds to the metallic sheet and flexible ceramic fabric. These materials are commercially available from Lucas-Milhaupt, Cudahy, Wis. or Wesgo, Inc., Belmont, Calif.

"NEXTEL®" refers to a registered trademark of the 3M Corporation of St. Paul, Minn. It describes an alumino borosilicate (ABS) fiber or fabric, available as e.g. NEXTEL 312 or NEXTEL 440.

"NICALON®" refers to a registered trademark of The Dow Corning Co., Midland, Mich. It is also available from Nippon Corporation of Tokyo, Japan. It describes a silicon carbide fiber or fabric.

The present invention provides thermal insulation and environmental and handling durability not previously associated with ceramic insulation TPS at temperatures up to 1800° F. The use of a metal foil brazed to the surface of a ceramic fabric provides improved processing, handling, and reduced maintenance as compared to previous ceramic blankets. These blankets have the ceramic fabric directly exposed to the work environment as well as the performance requirements. Therefore, reduced blanket damage occurs with the metal surface. All weather use is achieved because of the impervious nature of metals to weather conditions such as rain, sleet or hail. The composite article provides an aeroacoustically stable surface where strong aerodynamic forces are experienced during flight use of these blankets on space vehicles. Also, the composite article provides reduced air drag when compared to the fabric surface.

Referring now to FIGS. 1, 1A and 2, a ceramic insulation blanket 11 is fabricated as a flexible woven surface ceramic structure filled with a ceramic insulation 12. The ceramic is optionally coated with a thin coating of a metal or alloy as is described herein below. One surface of a thin metallic sheet 13 (0.005 in =5 mils or less) is attached by a brazing process to the surface of the ceramic fabric face, and the other flat surface is exposed to the environment. The metallic brazing alloy or ceramic brazing material 14 chemically wets the ceramic fabric in a vacuum or reducing atmosphere and at a high temperature (about 1800° F.) to bond the ceramic fabric to the metal sheet (foil). The metal sheet 13 is usually a high temperature alloy such as INCONEL®. The brazing material 14 is, for example, a copper/silver alloy having a titanium activator to promote wetting to the ceramic fabric.

Alternatively, a commercially available ceramic brazing material or adhesive Cotronics Adhesive 940 or 944 is used to connect the metal sheet and ceramic fabric.

Typically, the brazing material is placed on the ceramic fabric in a series of small dots. The total surface area of the dots cover about 10% of the total surface area of the ceramic fabric or about 10% of the surface area of one side of the metallic sheet, preferably less than about 8%, and more preferably less than about 5%. The dots are in a random or an organized pattern, or in a line pattern.

In a preferred embodiment the multiple dots are between about 0.125 to 0.25 sq in in area in a pattern centered about one in from each other. In another embodiment, the multiple dots are in a line (or a grid) separated by a spacing of about one inch.

The combination of the high temperature capability and the insulation properties of the ceramic blanket and the metal foil provide a durable and weatherproof thermal protection system 10 (TPS) capable of being used under severe weather and maintenance situations.

Other ceramic blanket systems are also to be utilized such as sewn, quilted blankets in which a highly thermally stable insulation batting is sandwiched between two ceramic fabrics stitched together with a ceramic sewing thread. This type of TPS is used to protect the Space Shuttle Orbiter Vehicle. Another example of a quilted blanket system is the Composite Flexible Blanket insulation (CFBI). The CFBI contains multi-foil layers which act as a reflector in a radiative heat environment. This system is reported in U.S. Pat. No. 5,038,693. By bonding a metal foil or sheet to the ceramic face fabric, a durable and weatherproof TPS is assembled. Other high temperature metal alloys are thermally matched to the thermal capability of the ceramic fabric and insulation to achieve maximum thermal performance. An additional fabrication approach is to chemically vapor deposit (CVD) a metal coating to the flexible ceramic fabric, thus providing a surface which can be wetted entirely by the brazing material.

The present invention provides the following improvements:

1. The use of brazing technique with a metal or alloy to bond a metal foil to the ceramic face fabric of a flexible ceramic insulation blanket.
2. A weatherproof surface which does not require a weatherproof treatment after successive uses at high temperatures.
3. The use of metal foil to provide a tough, durable surface that can endure physical and mechanical abuse not possible with flexible ceramic insulation blanket surfaces.
4. Lower aerodynamic drag on the smooth exterior metal surface. Properties of Nickel Coated Fibers and Fabrics Table 1 below shows the properties of a number of suitable coated and uncoated flexible ceramic fabrics. Table 1 indicates the weight of the fabrics and fibers, the thickness of the coating and the electrical conductivity of the coated tows and fabrics.

Three generic types of ceramic fabrics (ASTROQUARTZ® or silica, NEXTEL® or aluminoborosilicate and NICALON® or silicon carbide) were coated with a thin film of nickel coating for evaluation as substrate for brazing and/or bonding metallic foils to blankets. The commercial process used to deposit the nickel is described in a publicly available commercial document entitled "Properties of Nickel Coated Carbon and Kevlar Fibers Produced by The Decomposition of Nickel Carbonyl", by J. A. E. Bell, et al. INCO/Vapor Fab, Inc., N. Salt Lake City, Utah These nickel coated ceramic fabrics are commercially available from INCO/Vapor Fab, Inc. The ceramic fabrics were characterized using a Scanning Electron Microscope (SEM) to measure the thickness of the coating. The fabrics were weighed before and after coating to determine the weight gain after the coating process.

As is determined from the attached Table 1 the weight penalty for the fabrics was minimal varying from 1.4% to an 11.8% maximum. This weight penalty will be smaller in a completed TPS where the fabric is only one of the multiple components. Thus, the fabric of the present invention is optionally coated with a thin layer of metal, such as nickel, to improve the bonding properties of the ceramic fabric.

TABLE 1

NICKEL COATED CERAMIC FIBERS AND FABRICS
COMPREHENSIVE DATA TABLE-AVERAGES

| | Fibers | | | | Fabrics | | | |
|---|---|---|---|---|---|---|---|---|
| | ASTRO QUARTZ #2 | ASTRO QUARTZ #5 | NEXTEL 312 | NEXTEL 440 | NICALON | ASTRO QUARTZ | NEXTEL 312 | NEXTEL 440 |
| WEIGHTS (mg/cm) | | | | | | | | |
| virgin | .30 | .30 | 1.01 | 1.10 | .73 | 73.3 | 29.0 | 37.0 |
| coated | .58 | .51 | 1.51 | 1.36 | 1.01 | 74.4 | 32.9 | 40.5 |
| wt % Ni | 48 | 41 | 33 | 19 | 28 | 1.4 | 11.8 | 8.4 |
| THICKNESS (microns) | | | | | | | | |
| fiber diameter | 9.5 | 9.5 | (9.8 × 15.4) | | 16.0 | | | |
| SEM-pulled | .47 | .44 | .43 | .31 | .38 | @.05 | @.3 | @.15 |
| SEM-polished | .93 | .70 | .77 | .50 | .65 | — | — | — |
| theoretical (from wt. %) | .51 | .39 | .44 | .23 | .51 | — | — | — |
| CONDUCTIVITY | | | | | | | | |
| ohm/cm-tow | .53 | .50 | .23 | .42 | .37 | | | |
| ohm/sq.-fabric | | | | | | @3 | @.18 | @.20 |

The following Examples are provided to further explain and define the present invention. They are not to be construed as being limiting in any way.

EXAMPLE 1

DURA-TABI Test Results

The test conditions for the first sample are as follows: A one inch silicon carbide TABI is covered with a 0.005 inch thick INCONEL®625 alloy sheet from INCO, and the brazing material is copper/silver alloy having titanium as a wetting agent. The article is then exposed in a mini wind tunnel to a dynamic pressure of q=400 pounds per square foot (psf), an overall sound pressure level (OASPL) of 166 decibels (dB) and a fluctuating pressure, $\Delta$pk of $-1.5$ psi. A direction of the air stream is parallel to the plane of the sample. There was no change in the sample after 300 sec of exposure. A slight flutter is observed due to edge effects. The top view of the metal sheet shows virtually no change at these conditions. Dimples seen on the are the points of contact created by the heated and cooled brazing material with the flexible ceramic. The test sample survives these test conditions.

In a second test, the test conditions were as follows: test gas=argon, Mach number, M∞=7.8, Reynolds Number, $R_e$=11,600/ft and heat flux, q=1.4 Btu/sq. ft. sec. An 8° angle of attack from the parallel direction is used. The maximum temperature is 1300° F. and the time of exposure is 94 sec. The results are summarized in the last column of Table 2. No foil delamination is observed. A top view of metal sheet shows the metal sheet where some minor surface oxidation has occurred. One area is a bluish color, other areas are purple colored and one area is a red-brown color. The test sample survives these test conditions.

TABLE 2

DURA-TABI Arcjet Results

| Arcjet Test #: | AHF140028 | AHF140043 |
|---|---|---|
| Model: | Flat face | 8° wedge |
| Test Gas | Argon | Argon |
| M∞ | 7.8 | 7.8 |
| Re: | 11600/ft | 11600/ft |
| q: | 10.4 btu/ft²sec | 1.4 btu/ft²sec |
| $T_{max}$: | 1700° F. | 1300° F. |
| 'exposure: | 7 sec | 94 sec |

While only a few embodiments of the invention have been shown and described herein, it will become apparent to those skilled in the art that various modifications and changes can be made in the method to produce a flexible ceramic insulation having a refractory metal surface and the thermal protection system produced thereby without departing from the spirit and scope of the present invention. All such modifications and changes coming within the scope of the appended claims are intended to be carried out thereby.

We claim:

1. A method for joining a top surface of a woven flexible ceramic fabric structure which is filled with a ceramic insulation and a lower surface of a thin metal sheet which has an upper surface and a lower surface creating an integral metal surfaced flexible thermal protection article for use on the exterior surface of a space vehicle, which method comprises:

a. placing a high temperature metallic or ceramic brazing material at multiple contact points located between and in contact with the surface of the woven flexible ceramic fabric structure which is filled with a ceramic insulation and the metal sheet;

b. heating the woven flexible ceramic fabric, ceramic insulation, brazing material, and metal sheet for a time to integrally connect the metal sheet, the braze, and the woven flexible ceramic fabric, which contains the ceramic insulation at the multiple contact points, with the proviso that the total surface area covered by the multiple contact points is about 10% or less of the total surface area of one flat surface of the metal sheet; and c. cooling the formed integral metal surfaced flexible thermal protection article to ambient temperature, wherein said woven flexible ceramic fabric, ceramic insulation, brazing material, and metal sheet are heated between about 1,100° and 2,000° F.

2. The method of claim 1 wherein the thin metal sheet comprises titanium, aluminum, chromium, niobium, or combinations thereof.

3. The method of claim 1 wherein the brazing material is selected from copper/silver or copper/gold, each having either titanium or vanadium as wetting agents or ceramic brazing material comprising alumina.

4. The method of claim 1 wherein the brazing material is selected from copper/silver or a ceramic material comprising alumina, zirconia or $SiO_2$.

5. The method of claim 1 wherein the woven flexible ceramic fabric is selected from fibers comprising silicon, carbon, nitrogen, boron, oxygen, aluminum or combinations thereof.

6. The method of claim 5 wherein the woven flexible ceramic fabric comprises silica, silicon carbide, aluminoborosilicate, silicon nitride, boron nitride, alumina or zirconia.

7. The method of claim 1 wherein the temperature of heating is between about 1,100° and 1,800° F.

8. The method of claim 7 wherein the thin metal sheet is between about 0.001 and 0.005 inches in thickness and comprises titanium, aluminum, chromium, niobium, or combinations thereof;

the woven flexible ceramic fabric is selected from ceramic fibers comprising silicon, carbon, boron, nitrogen, aluminum or combinations thereof; and the brazing material is selected from copper/silver or copper/gold, each having titanium or vanadium as wetting agents, or from ceramics selected from alumina, zirconia or $SiO_2$.

9. The method of claim 8 wherein the woven flexible ceramic fabric comprises silica, silicon carbide, aluminoborosilicate, silicon nitride, boron nitride, alumina or zirconia.

10. The method of claim 7 wherein the thin metal sheet comprises titanium, the flexible ceramic comprises silicon carbide, and the brazing material is copper/silver having titanium as a wetting agent.

11. The integral metal sheet surfaced flexible thermal protection article produced by the method of claim 1.

12. The integral metal sheet surfaced flexible thermal protection article produced by the method of claim 6.

13. The integral metal sheet surfaced flexible thermal protection article produced by the method of claim 9.

14. An integral metal sheet surfaced flexible thermal protection article, which article comprises:

a thin metallic sheet having an upper surface and a lower surface as a surface component;

a woven flexible ceramic fabric structure which is filled with a ceramic insulation; and a multiplicity of high temperature metallic or ceramic contact points or contact lines of a brazing material which contact discrete separate regions of the lower surface of the metallic sheet and the woven flexible ceramic fabric structure and connecting the metallic sheet and ceramic fabric, with the proviso that the total surface area of the contact points or contact lines are about 10% or less of the total surface area of the lower surface of the metallic sheet.

15. The article of claim 14 wherein:

the thin metallic sheet comprises titanium, aluminum, chromium, niobium, or combinations thereof.

16. The article of claim 14 wherein the woven flexible ceramic fabric structure comprises a ceramic of silicon, carbon, boron, nitrogen, aluminum or combinations thereof.

17. The article of claim 14 wherein the brazing material is selected from metal compositions of copper/silver with titanium or vanadium as a wetting agent or copper/gold with titanium or vanadium as a wetting agent, or from ceramic compositions selected from alumina, zirconia or $SiO_2$.

18. The article of claim 17 wherein the thin metallic sheet comprises titanium, niobium or combinations thereof;

the woven flexible ceramic fabric is selected from fibers of silica, $SiO_2$, alumina, silicon carbide, silicon nitride, aluminoborosilicate, or boron nitride; and the brazing material is a metal composition.

19. The article of claim 18 wherein the metallic sheet comprises titanium, the woven flexible ceramic fabric is a ceramic selected from silica or silicon carbide, and, the brazing material is copper/silver having titanium as a wetting agent.

* * * * *